Patented Jan. 11, 1949

2,458,718

UNITED STATES PATENT OFFICE 2,458,718

STABILIZATION OF SULFUR TRIOXIDE

Harold G. McCann, Flushing, N. Y., assignor to Allied Chemical & Dye Corporation, a corporation of New York No Drawing. Application February 9, 1946, Serial No. 646,699

15 Claims. (Cl. 23—174)

This invention relates to the stabilization of liquid sulfur trioxide (substantially pure $SO_3$) and high strength oleums.

At room temperature, liquid sulfur trioxide polymerizes to various degrees. The three generally recognized $SO_3$ modifications melt at approximately 17° C., 32.5° C., and 62° C., respectively. On standing at temperature below about 27° C., in the presence of even small amounts of moisture, the form melting at about 17° C. rapidly polymerizes to the higher melting forms, the mass soon becomes solid, and melts only under pressure, sometimes requiring temperatures up to 100° C. to effect complete liquefaction. Oleums of free $SO_3$ strengths upward of about 80% tend to polymerize in similar fashion, degree of polymerization depending chiefly upon the $SO_3$ strength of the oleum and temperatures at which the material is stored. In oleums of the lower portions of the $SO_3$ strength range indicated, certain polymers form, the degree of polymerization increases on passage of time, and while the material may not solidify completely, the ultimate mass may be a liquid phase containing in suspension the various solid polymers noted.

In many industrial processes, it is highly desirable to use $SO_3$ in its strongest obtainable form. However, the foregoing characteristics of sulfur trioxide and high strength oleums create marked disadvantages relative to the storage, shipment and use of such materials. While, for example, sulfur trioxide might be shipped in drums equipped with heating coils, there is involved the first problem of supplying a relatively expensive form of container. Moreover, since heat transfer thru a solid material is poor, the solidified sulfur trioxide in the container can be melted by the user only with considerable difficulty. In addition to this disadvantage, after relatively long periods of standing, a large proportion of the sulfur trioxide will have polymerized to the high melting form in which case complete melting can only be effected by heating at high temperature under considerable pressure. To a lesser extent the same disadvantages apply to high strength oleums.

This invention aims to provide methods for making stabilized forms of liquid sulfur trioxide or high strength oleums which either do not polymerize to any substantial degree and remain liquid at room temperature, or in which, if polymerization does take place, the polymers formed are readily meltable at moderate temperatures of about 40° C. and below, i. e. temperatures which do not require substantial vaporization of $SO_3$, or use of heating containers capable of withstanding relatively high pressures, as is the case when high temperatures are needed to melt the more refractory types of polymers.

According to this invention, it has been found that the incorporation of relatively small amounts of boron compound, with substantially 100% sulfur trioxide or oleums of $SO_3$ strength such that $SO_3$ polymers tend to form, accomplishes the advantageous objectives stated above.

Specific modes of carrying out the invention depend upon whether it is desired to make a finished product which does not polymerize to any substantial extent and remains liquid at about room temperature, or whether the desired product is one which may contain solid polymers which are easily meltable at temperature of about 40° C. or less.

As indicated above, oleums of $SO_3$ strength of about 80% and upward tend to polymerize to greater or less extent depending mostly upon $SO_3$ strength and time and temperature of storage. It has been found that the mere incorporation of a boron compound, with oleums of $SO_3$ strength of about 80% and upward or with liquid substantially 100% sulfur trioxide, results in a product in which, if it contains polymers, such polymers are easily meltable at temperature of about 40° C. or less.

Suitable boron compounds which may be used in carrying out the invention are those of the class consisting of the oxides, and halides of boron and the inorganic derivatives thereof such as boron trioxide, $B_2O_3$; boron trichloride, $BCl_3$; boron trifluoride, $BF_3$; borax, $Na_2B_4O_7$; sodium and potassium fluoborates, $NaBF_4$ and $KBF_4$; boric acid itself, $H_3BO_3$, or any of its dehydrated forms such as metaboric acid, $HBO_2$ or pyroboric acid, $H_2B_4O_7$. The preferred treating material is boron trioxide, and the next most desirable material is boron trichloride.

Choice of the particular treating material to be employed depends upon whether it is desired to make a product which contains substantially no polymers and remains liquid at about room temperature, or to make a product which may contain polymers but which polymers are meltable at temperature below about 40° C.; whether it is objectionable to introduce water into the product (which water may be brought in with the treating material either as free water or water of constitution); or whether according to the circumstances it is undesirable to form a final product which may contain a small amount of precipitate. When it is desired to make a product which may contain polymers, but which are meltable at temperatures less than about 40° C., and it is immaterial whether or not some water is brought into the product along with the treating agent, and where it is immaterial whether the product contains a small amount of precipitate, any of the indicated stabilizing agents may be used. If the sought-for product should not contain a precipitate, $Na_2B_4O_7$, $KBF_4$, $NaBF_4$ should not be employed. On the other hand, if circumstances be such that it is not desirable to introduce water in any form into the product, the treating material should contain substantially no free water nor water of constitution, "free water" being used in the sense as to include occluded moisture and water of crystallization.

The quantities of treating agent employed depend chiefly upon the degree of polymerization inhibition desired. It has been found that no additional advantages are obtained when the treating material is used in amount equivalent to more than 1.5% by weight of boron. Ordinarily it is preferred to utilize treating material in amount equivalent to not more than 0.6% by weight of boron, the latter quantity being generally appreciably more than adequate to effect stabilization of sulfur trioxide or oleum of $SO_3$ strength of about 80% and up when the sought-for product is such that if the product contains polymers such polymers are readily meltable at temperature below about 40° C.

In accordance with another phase of the invention, it has been found possible to make high $SO_3$ strength products which do not polymerize to any appreciable extent and which remain substantially in liquid form when brought to room temperature even though previously stored for several weeks at temperature of zero degrees C. and less. This embodiment of the invention comprises treating substantially 100% liquid sulfur trioxide or oleum of $SO_3$ strength not less than 99.5% (balance $H_2SO_4$) with a boron compound containing substantially no free water nor water of constitution, and then subjecting the resulting material to a heat treatment. When practicing this aspect of the invention and it is desired to make a product which does not contain a precipitate, suitable stabilizing agents to employ are $B_2O_3$, $BCl_3$ or $BF_3$, anhydrous $B_2O_3$ being the preferred material. On the other hand, if a small amount of precipitate in the product is unobjectionable, $KBF_4$, $NaBF_4$ or $Na_2B_4O_7$ may be used. However, in the best embodiments of the invention, use of these latter agents is not preferred since in some circumstances if the resulting treated materials are stored at temperatures below their freezing points, there may form some polymers which require heating to about 40° C. to effect melting.

In the practice of the preferred embodiments, the quantities of treating material incorporated may be about the same as previously indicated, although in this situation it is rarely necessary to use the boron compound in amount equivalent to as much as 0.6% by weight, and often, particularly when using $B_2O_3$, the quantity of the latter may be as little as equivalent to 0.03% by weight of boron.

After incorporation of the treating material, the heat treatment may be carried out in a closed vessel, suitable to withstand any pressure generated, at temperature ordinarily not less than about 60° C. and usually in the range of 60° C. to 100° C. Duration of the time of heat treatment is dependent largely upon the degree of polymerization inhibition desired. Any appreciable amount of heat treatment even at the low temperature of about 60° C. markedly cuts down the degree of polymerization, and if a product which is largely liquid phase but contains some solid phase at about room temperature is unobjectionable, heating at the low temperature of about 60° C. for about an hour or so may be employed. The greater the desired state of liquidity of the product at temperature of about 20° C., the greater the temperature and time of heating of the heat treatment stage should be. Preferably, heat treatment is carried out for a period of from 2 to 10 hours.

The preferred products of the invention, i. e. those which do not polymerize to any appreciable extent and which remain substantially in liquid form at about room temperature, preferably should be kept sealed off from contact with air since after heat treatment a small amount of moisture causes such products to lose some stability and to form polymers which may require heating to about 40° C. to effect melting.

The sulfur trioxide or oleum to be treated may be obtained from any suitable source. For example, substantially 100% $SO_3$ may be obtained by distilling say 30% oleum under conditions to avoid vaporization of $H_2SO_4$, and condensing the $SO_3$ at temperature, say 20–30° C., at which liquid sulfur trioxide has sufficiently low vapor pressure. Similarly, liquid sulfur trioxide may be obtained from the dry mist free, say 10% $SO_3$ gas exiting a catalytic $SO_2$ oxidation operation, by compressing the gas to about 160–170 lbs. per square inch, and cooling the compressed gas to 20–25° C., under which conditions about 70% of the $SO_3$ may be liquefied and recovered as substantially 100% liquid sulfur trioxide.

The treating material used may be added directly to the liquid to be stabilized, or in the case of stabilizing substantially 100% sulfur trioxide, the vaporous $SO_3$ conveniently may be condensed in a closed vessel in which the treating material to be used has been previously placed.

According to one example of practice of the invention, oleum of about 60% free $SO_3$ strength was distilled under conditions to avoid vaporization of $H_2SO_4$, the $SO_3$ vapor was condensed in a closed vessel at temperature of about 20° C., anhydrous $B_2O_3$ stabilizing agent having been previously placed in the condenser. The amount of anhydrous $B_2O_3$ used was equivalent to 0.09% of boron based on the total weight of condensed $SO_3$. After all of the $SO_3$ used in the run was condensed, the liquor mass in the condenser was agitated, and there was obtained a product which, on standing at temperatures less than 20° C., contained some polymers, but all of such polymers melted when the treated material was heated to about 40° C.

In another example, $SO_3$ was distilled out of oleum containing 60% $SO_3$ under conditions to prevent distillation of any $H_2SO_4$, and the $SO_3$ vapor was condensed at temperature of 25° C. in a closed container into which anhydrous $B_2O_3$ had been previously introduced. The quantity of $B_2O_3$ used was equivalent to 0.03% of boron based on the weight of the total amount of liquid $SO_3$ treated. When all the $SO_3$ to be stabilized had been collected in the condensing vessel, the latter was tightly sealed and heated at temperature of about 80° C. for about 8 hours with occasional agitation, the liquid was allowed to cool at room temperature, and the resulting product was such as to be liquid at room temperature even after having been stored for several weeks at temperature of about 0° C.

I claim:

1. The method of stabilizing material of the group consisting of sulfur trioxide and oleum of $SO_3$ strength such that $SO_3$ polymers tend to form, which method comprises incorporating with said material a boron compound in amount equivalent to not more than 1.5% by weight of boron.

2. The method of stabilizing material of the group consisting of sulfur trioxide and oleum of $SO_3$ strength such that $SO_3$ polymers tend to form, which method comprises incorporating with said material a compound of the class consisting of the oxides and halides of boron and the inorganic derivatives thereof, in amount equivalent to not more than 1.5% by weight of boron.

3. The method of stabilizing material of the group consisting of sulfur trioxide and oleum of $SO_3$ strength not less than 80%, which method comprises incorporating with said material a boron compound in amount equivalent to not more than 1.5% by weight of boron.

4. The method of stabilizing material of the group consisting of sulfur trioxide and oleum of $SO_3$ strength not less than 80% which method comprises incorporating with said material a compound of the class consisting of the oxides and halides of boron and the inorganic derivatives thereof, in amount equivalent to not more than 0.6% by weight of boron.

5. The method of stabilizing material of the group consisting of sulfur trioxide and oleum of $SO_3$ strength not less than 80%, which method comprises incorporating boron trioxide with said material in amount equivalent to not more than 0.6% by weight of boron.

6. The method of stabilizing material of the group consisting of sulfur trioxide and oleum of $SO_3$ strength not less than 99.5%, which method comprises incorporating substantially anhydrous boron trioxide with said material in amount equivalent to not more than 1.5% by weight of boron.

7. The method of stabilizing material of the group consisting of sulfur trioxide and oleum of $SO_3$ strength not less than 99.5%, which method comprises incorporating with said material a compound of the class consisting of the oxides and halides of boron and the inorganic derivatives thereof, in amount equivalent to not more than 1.5% by weight of boron, said compound containing substantially no free water nor water of constitution, and heating the resulting material at temperatures not less than 60° C. in a closed container for not less than two hours.

8. The method of stabilizing material of the group consisting of sulfur trioxide and oleum of $SO_3$ strength not less than 99.5%, which method comprises incorporating substantially anhydrous boron trioxide with said material in amount equivalent to not more than 1.5% by weight of boron and subjecting the resulting material to heat treatment.

9. The method of stabilizing material of the group consisting of sulfur trioxide and oleum of $SO_3$ strength not less than 99.5%, which method comprises incorporating substantially anhydrous boron trioxide with said material, in amount equivalent to not more than 0.6% by weight of boron, and heating the resulting material at temperature of 60°–100° C. in a closed container for a period of from two to ten hours.

10. A composition comprising material of the group consisting of sulfur trioxide and oleum of $SO_3$ strength such that $SO_3$ polymers tend to form, and containing boron compound in amount equivalent to not more than 1.5% by weight of boron.

11. A composition comprising material of the group consisting of sulfur trioxide and oleum of $SO_3$ strength not less than 80%, and containing boron compound in amount equivalent to not more than 1.5% by weight of boron, said boron compound having been derived from an incorporated boron trioxide.

12. A composition comprising material of the group consisting of sulfur trioxide and oleum of $SO_3$ strength not less than 80%, and containing boron compound in amount equivalent to not more than 0.6% by weight of boron, said boron compound having been derived from an incorporated compound of the class consisting of the oxides and halides of boron and the inorganic derivatives thereof.

13. A composition comprising material of the group consisting of sulfur trioxide and oleum of $SO_3$ strength not less than 99.5%, and containing boron compound in amount equivalent to not more than 0.6% by weight of boron, said boron compound having been derived from incorporated substantially anhydrous boron trioxide.

14. The method of stabilizing material of the group consisting of sulfur trioxide and oleum of $SO_3$ strength not less than 99.5%, which method comprises incorporating with said material a compound of the class consisting of the oxides and halides of boron and the inorganic derivatives thereof, in amount equivalent to not more than 1.5% by weight of boron, said compound containing substantially no free water nor water of constitution, and then subjecting the resulting material to heat treatment.

15. A composition comprising material of the group consisting of sulfur trioxide and oleum of $SO_3$ strength such that $SO_3$ polymers tend to form, and containing boron compound in amount equivalent to not more than 1.5% by weight of boron, said boron compound having been derived from an incorporated compound of the class consisting of the oxides and halides of boron and the inorganic derivatives thereof.

HAROLD G. McCANN.

REFERENCES CITED

The following references are of record in the file of this patent:

Deutsche Chemische Gesellschaft (Berichte), 73B, pp. 1397–8.

Mellor: Inorg. and Theoretical Chem., vol. 5 (p. 146), Longmans, Green & Co., N. Y.